US012596471B2

(12) United States Patent
Kim et al.

(10) Patent No.: US 12,596,471 B2
(45) Date of Patent: *Apr. 7, 2026

(54) DEVICE AND METHOD WITH TRAINED NEURAL NETWORK TO IDENTIFY TOUCH INPUT

(71) Applicant: SAMSUNG ELECTRONICS CO., LTD., Suwon-si (KR)

(72) Inventors: Dongchan Kim, Suwon-si (KR); Jinyoung Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/746,420

(22) Filed: Jun. 18, 2024

(65) Prior Publication Data

US 2024/0338122 A1 Oct. 10, 2024

Related U.S. Application Data

(63) Continuation of application No. 18/112,255, filed on Feb. 21, 2023, now Pat. No. 12,045,458, which is a
(Continued)

(30) Foreign Application Priority Data

Aug. 21, 2020 (KR) ........................ 10-2020-0105617

(51) Int. Cl.
*G06F 3/048* (2013.01)
*G06F 3/04883* (2022.01)
(Continued)

(52) U.S. Cl.
CPC ............ *G06F 3/04883* (2013.01); *G06T 7/50* (2017.01); *G06T 7/62* (2017.01); *G06V 10/761* (2022.01);
(Continued)

(58) Field of Classification Search
CPC ...... G06V 20/70; G06V 10/82; G06V 10/761; G06T 2207/20081; G06T 7/62; G06T 7/50; G06F 3/04883
See application file for complete search history.

(56) References Cited

U.S. PATENT DOCUMENTS 7,698,235 B2 4/2010 Kuroiwa
7,835,999 B2 11/2010 Block
(Continued)

FOREIGN PATENT DOCUMENTS

CN 107734089 A 2/2018
CN 110554793 A 12/2019
(Continued)

OTHER PUBLICATIONS

Huawei Mate 30 Pro (https://consumer.huawei.com/ph/phones/mate30-pro/specs/) Retrieved on May 19, 2020.
(Continued)

*Primary Examiner* — Liliana Cerullo
(74) *Attorney, Agent, or Firm* — Sughrue Mion, PLLC

(57) ABSTRACT

An electronic device includes a touch screen and a processor configured to: based on a touch input of a user being acquired through the touch screen, acquire an image corresponding to the acquired touch input of the user; identify a type of the acquired touch input of the user by inputting, to a neural network model for identifying the type of the touch input of the user, the acquired image, a first image corresponding to a first type touch input obtained by touching the touch screen with a pressure smaller than a preconfigured pressure, and a second image corresponding to a second type touch input obtained by touching the touch screen with a pressure greater than the preconfigured pressure; and perform a function based on the identified type of the touch input.

16 Claims, 12 Drawing Sheets

Related U.S. Application Data continuation of application No. PCT/KR2021/007825, filed on Jun. 22, 2021.

(51) Int. Cl.

| | |
|---|---|
| *G06T 7/50* | (2017.01) |
| *G06T 7/62* | (2017.01) |
| *G06V 10/74* | (2022.01) |
| *G06V 10/82* | (2022.01) |
| *G06V 20/70* | (2022.01) |

(52) U.S. Cl.

CPC .............. *G06V 10/82* (2022.01); *G06V 20/70* (2022.01); *G06T 2207/20081* (2013.01)

(56) References Cited

U.S. PATENT DOCUMENTS

| | | | |
|---|---|---|---|
| 8,432,368 | B2 | 4/2013 | Momeyer et al. |
| 8,473,448 | B2 | 6/2013 | Yuta |
| 8,723,824 | B2 | 5/2014 | Myers et al. |
| 9,104,308 | B2 | 8/2015 | Au et al. |
| 9,454,301 | B2 | 9/2016 | Ka et al. |
| 9,507,407 | B2 | 11/2016 | Ng et al. |
| 9,639,204 | B2 | 5/2017 | Kim et al. |
| 9,733,745 | B1 | 8/2017 | Kremin |
| 9,823,781 | B2 | 11/2017 | Ludwig et al. |
| 10,013,094 | B1 | 7/2018 | Smith |
| 10,073,559 | B2 | 9/2018 | Kim et al. |
| 10,241,621 | B2 | 3/2019 | Kang |
| 10,261,685 | B2 | 4/2019 | Deselaers et al. |
| 10,296,210 | B2 | 5/2019 | Jin et al. |
| 10,379,657 | B2 | 8/2019 | Filiz et al. |
| 10,459,561 | B2 | 10/2019 | Bosch Ruiz et al. |
| 10,496,705 | B1 | 12/2019 | Irani et al. |
| 10,545,662 | B2 | 1/2020 | Kim |
| 10,558,792 | B2 | 2/2020 | Jiang et al. |
| 10,777,193 | B2 | 9/2020 | Lee et al. |
| 10,782,821 | B2 | 9/2020 | Bjerre |
| 10,795,481 | B2 | 10/2020 | Tsai et al. |
| 10,949,022 | B2 | 3/2021 | Lee |
| 11,099,679 | B2 | 8/2021 | Ledet et al. |
| 11,422,688 | B2 | 8/2022 | Kim et al. |
| 11,977,699 | B2 | 5/2024 | Hwang et al. |
| 12,045,458 | B2 * | 7/2024 | Kim ........................ G06V 20/70 |
| 2008/0106520 | A1 | 5/2008 | Free et al. |
| 2009/0251432 | A1 * | 10/2009 | Wang .................. G06F 3/04883 |
| | | | 345/173 |
| 2010/0145896 | A1 | 6/2010 | Yuta |
| 2011/0007023 | A1 | 1/2011 | Abrahamsson et al. |
| 2012/0019456 | A1 | 1/2012 | Choi et al. |
| 2012/0056846 | A1 | 3/2012 | Zaliva |
| 2015/0161231 | A1 | 6/2015 | Yu et al. |
| 2015/0241950 | A1 | 8/2015 | Ng et al. |
| 2016/0012348 | A1 * | 1/2016 | Johnson .................. G06N 20/20 |
| | | | 706/12 |
| 2016/0224171 | A1 | 8/2016 | Kim et al. |
| 2017/0010732 | A1 * | 1/2017 | Bosch Ruiz .......... G06F 3/0412 |
| 2017/0192602 | A1 | 7/2017 | Kim et al. |
| 2017/0200274 | A1 | 7/2017 | Tan et al. |
| 2017/0293396 | A1 | 10/2017 | Jung et al. |
| 2017/0357425 | A1 | 12/2017 | Smith et al. |
| 2018/0095588 | A1 | 4/2018 | Klein et al. |
| 2018/0107332 | A1 | 4/2018 | Chan et al. |
| 2018/0188938 | A1 | 7/2018 | Deselaers et al. |
| 2018/0276630 | A1 | 9/2018 | Kim et al. |
| 2018/0374476 | A1 | 12/2018 | Lee et al. |
| 2019/0204929 | A1 | 7/2019 | Attari et al. |
| 2019/0294954 | A1 | 9/2019 | Han et al. |
| 2019/0318261 | A1 | 10/2019 | Deng et al. |
| 2019/0354238 | A1 | 11/2019 | Akhbari et al. |
| 2020/0012382 | A1 | 1/2020 | Lee |
| 2020/0057525 | A1 | 2/2020 | Prest et al. |
| 2020/0097845 | A1 | 3/2020 | Shaikh et al. |
| 2020/0110774 | A1 | 4/2020 | Lakshmanan et al. |
| 2020/0167693 | A1 | 5/2020 | Jiang et al. |
| 2020/0202171 | A1 | 6/2020 | Hughes et al. |
| 2020/0218793 | A1 | 7/2020 | Storm et al. |
| 2020/0302339 | A1 * | 9/2020 | Nadamuni Raghavan .................. |
| | | | G06F 3/0659 |
| 2020/0310621 | A1 | 10/2020 | Piot et al. |
| 2020/0349246 | A1 | 11/2020 | Budman et al. |
| 2020/0394451 | A1 | 12/2020 | Baijal et al. |
| 2021/0327421 | A1 | 10/2021 | Beaufays et al. |
| 2021/0397342 | A1 * | 12/2021 | Luo ........................ G06F 3/0488 |
| 2022/0043984 | A1 | 2/2022 | Miranda et al. |
| 2022/0108788 | A1 | 4/2022 | Shelton, IV et al. |
| 2022/0375201 | A1 | 11/2022 | Wiles |
| 2023/0113131 | A1 * | 4/2023 | O'Banion ............ G06V 10/761 |
| | | | 382/100 |

FOREIGN PATENT DOCUMENTS

| | | |
|---|---|---|
| CN | 111061394 A | 4/2020 |
| CN | 111061394 B | 8/2021 |
| EP | 4 174 629 A1 | 5/2023 |
| EP | 4 261 663 A1 | 10/2023 |
| JP | 5083320 B2 | 11/2012 |
| JP | 2015-69225 A | 4/2015 |
| KR | 10-1189078 B1 | 10/2012 |
| KR | 10-1202414 B1 | 11/2012 |
| KR | 10-1350782 B1 | 1/2014 |
| KR | 10-1577277 B1 | 12/2015 |
| KR | 10-1653167 B1 | 9/2016 |
| KR | 10-2017-0001108 A | 1/2017 |
| KR | 10-2017-0030246 A | 3/2017 |
| KR | 10-2017-0111773 A | 10/2017 |
| KR | 10-2018-0017500 A | 2/2018 |
| KR | 10-2018-0106744 A | 10/2018 |
| KR | 10-2019-0001434 A | 1/2019 |
| KR | 10-2019-0104101 A | 9/2019 |
| KR | 10-2019-0105767 A | 9/2019 |
| KR | 10-2019-0109805 A | 9/2019 |
| KR | 10-2019-0116035 A | 10/2019 |
| KR | 10-2020-0014510 A | 2/2020 |
| KR | 10-2020-0142374 A | 12/2020 |
| WO | 2016/007450 A1 | 1/2016 |
| WO | 2017/007573 A1 | 1/2017 |
| WO | 2017/114062 A1 | 7/2017 |
| WO | 2018/125347 A1 | 7/2018 |
| WO | 2019/159012 A1 | 8/2019 |

OTHER PUBLICATIONS

Communication dated May 4, 2022, issued by the International Searching Authority in counterpart International Application No. PCT/KR2022/001706 (PCT/ISA/220, 210, 237).

Communication dated Sep. 24, 2021, issued by the International Searching Authority in counterpart International Application No. PCT/KR2021/007825 (PCT/ISA/237).

Communication dated Sep. 24, 2021, issued by the International Searching Authority in counterpart International Application No. PCT/KR2021/007825 (PCT/ISA/210).

Rumelhart et al., "Learning representations by back-propagating errors," Nature vol. 323 , Oct. 9, 1986, Total 4 pages.

Written Opinion (PCT/ISA/237) issued by the International Searching Authority on Feb. 23, 2022 in corresponding International Application No. PCT/KR2021/017280.

Howard et al., "Searching for MobileNetV3," arXiv:1905.02244v5 [cs.CV], Nov. 20, 2019, Total 11 pages.

Boceck et al., "Force Touch Detection on Capacitive Sensors using Deep Neural Networks," Published: MobileHCI '19: Proceedings of the 21st International Conference on Human-Computer Interaction with Mobile Devices and Services, Oct. 2019, Total 6 pages.

Yong Liu et al., "Ensemble Learning-Based Technique for Force Classifications in Piezoelectric Touch Panels", IEEE Sensors Journal, vol. 20, Issue 16, 11 pages, Apr. 13, 2020.

Written Opinion (PCT/ISA/237) issued by the International Searching Authority on Feb. 21, 2022 in corresponding International Application No. PCT/KR2021/016889.

(56) References Cited

OTHER PUBLICATIONS

International Search Report (PCT/ISA/210) issued by the International Searching Authority on Feb. 21, 2022 in corresponding International Application No. PCT/KR2021/016889.

Ioffe et al., "Batch Normalization: Accelerating Deep Network Training by Reducing Internal Covariate Shift," arXiv:1502.03167v3 [cs.LG], Mar. 2, 2015, Total 11 pages.

Woo et al., "CBAM: Convolutional Block Attention Module," arXiv: 1807.06521v2 [cs.CV], Jul. 18, 2018, Total 17 pages.

International Search Report (PCT/ISA/210) issued by the International Searching Authority on Feb. 23, 2022 in corresponding International Application No. PCT/KR2021/017280.

Notice of Allowance issued Nov. 29, 2023 issued by the United States Patent Office for U.S. Appl. No. 17/694,155.

Communication dated Nov. 16, 2023 issued by the European Patent Office for EP Patent Application No. 21858454.8.

Communication dated Jun. 12, 2024, issued by the European Patent Office in European Application No. 21921451.7.

Communication dated May 7, 2024, issued by the European Patent Office in European Application No. 21919860.3.

Communication dated Jun. 2, 2023, issued by the European Patent Office in European Application No. 22704489.8.

Office Action dated Jul. 21, 2023, issued by the U.S. Patent and Trademark Office in U.S. Appl. No. 17/694,155.

Communication dated Dec. 17, 2024, issued by the European Patent Office in European Application No. 22704489.8.

Office Action dated Dec. 19, 2024, issued by the U.S. Patent and Trademark Office in U.S. Appl. No. 18/221,288.

Kim et al., "Artificial Intelligence-Based Optimal Grasping Control," MDPI, Sensors 2020, 20, 6390, Total 17 pages, Nov. 9, 2020.

Zhang et al., "BeyondTouch: Extending the Input Language with Built-in Sensors on Commodity Smartphones," IUI'15, Mar. 29-Apr. 1, 2015, Atlanta, GA, USA, Total 11 pages.

Communication dated Apr. 1, 2025, issued by the Korean Intellectual Property Office in Korean Application No. 10-2020-0105617.

Office Action dated Jul. 7, 2025, issued by the U.S. Patent and Trademark Office in U.S. Appl. No. 18/221,288.

Office Action dated Jul. 21, 2025, issued by the Korean Intellectual Property Office in Korean Patent Application No. 10-2021-0004241.

Office Action dated Aug. 8, 2025, issued by the Korean Intellectual Property Office in Korean Patent Application No. 10-2021-0008918.

Notice of Allowance dated Sep. 30, 2025, issued by the U.S. Patent and Trademark Office in U.S. Appl. No. 18/221,288.

Office Action dated Oct. 1, 2025, issued by the U.S. Patent and Trademark Office in U.S. Appl. No. 18/224,868.

Communication dated Oct. 21, 2025, issued by the European Patent Office in European Application No. 22704489.8.

Communication issued Feb. 5, 2026 by the European Patent Office in European Patent Application No. 21919860.3.

* cited by examiner

FIG. 2B

| CLASS LABEL | | FINGER LABEL | |
|---|---|---|---|
| LONG TOUCH | 1 | RIGHT HAND_THUMB | 0 |
| | | RIGHT HAND_INDEX FINGER | 1 |
| | | RIGHT HAND_MIDDLE FINGER | 2 |
| | | RIGHT HAND_RING FINGER | 3 |
| | | RIGHT HAND_LITTLE FINGER | 4 |
| | | LEFT HAND_THUMB | 5 |
| | | LEFT HAND_INDEX FINGER | 6 |
| | | LEFT HAND_MIDDLE FINGER | 7 |
| | | LEFT HAND_RING FINGER | 8 |
| | | LEFT HAND_LITTLE FINGER | 9 |
| FORCE TOUCH | 2 | RIGHT HAND_THUMB | 1 |
| | | RIGHT HAND_INDEX FINGER | 2 |
| | | ⋮ | ⋮ |

100

DEVICE AND METHOD WITH TRAINED NEURAL NETWORK TO IDENTIFY TOUCH INPUT

CROSS-REFERENCE TO RELATED APPLICATIONS

This application is a Continuation of U.S. application Ser. No. 18/112,255 filed Feb. 21, 2023, which is bypass continuation of International Application No. PCT/KR2021/007825, filed on Jun. 22, 2021, which is based on and claims priority to Korean Patent Application No. 10-2020-0105617 filed on Aug. 21, 2020, in the Korean Intellectual Property Office, the disclosures of which are incorporated by reference herein in their entireties.

BACKGROUND

1. Field

The disclosure relates to an electronic device and a control method thereof, and more particularly, to an electronic device which may detect a force touch and a control method thereof.

2. Description of Related Art

Various electronic devices may acquire a touch input of a user by using a touch screen or panel, and perform a function based on the touch input. Recently, an attempt has been made to introduce a force touch into the electronic device to diversify the touch input of the user. The force touch refers to a gesture interface implemented through a pressure of the user on the touch panel.

A pressure sensor for measuring the touch pressure of the user needs to be installed on the touch panel to implement the force touch. This configuration may cause an increase in a manufacturing cost of the touch panel or the electronic device including the touch panel, which results in issues in manufacturing the touch panel or the electronic device made smaller.

Accordingly, there is a need for technology for implementing the force touch without using the pressure sensor.

SUMMARY

Provided is an electronic device which may detect a force touch of a user by using a neural network model to improve user convenience and satisfaction.

Additional aspects will be set forth in part in the description which follows and, in part, will be apparent from the description, or may be learned by practice of the presented embodiments.

According to an aspect of the disclosure, a control method of an electronic device, includes: acquiring a plurality of first images corresponding to a first type touch input for touching a touch screen of the electronic device with a pressure less than a predetermined pressure, and a plurality of second images corresponding to a second type touch input for touching the touch screen with a pressure greater than the predetermined pressure; storing the plurality of first images and the plurality of second images; training a neural network model for identifying a type of a touch input of a user based on the plurality of first images and the plurality of second images; based on acquiring a touch input of the user through the touch screen, acquiring a plurality of images corresponding to the acquired touch input of the user; identifying a type of the acquired touch input of the user by inputting, to the trained neural network model, the plurality of acquired images, the plurality of first images, and the plurality of second images; and performing a function corresponding to the acquired touch input of the user based on the identified type of the touch input.

The acquiring the plurality of first images and the plurality of second images may include: displaying, on the touch screen, a user interface (UI) element for guiding the touch input of the user corresponding to each of the first type touch input and the second type touch input; and based on detecting the touch input of the user for touching the UI element, generating a plurality of images corresponding to the detected touch input.

The displaying may include displaying, on the touch screen, a first UI element for guiding the first type touch input and a second UI element for guiding the second type touch input, and a size of the second UI element may be greater than a size of the first UI element.

The method may further include: based on a first function corresponding to the first type touch input being performed based on the acquired touch input of the user, allocating a first label corresponding to the first type touch input to the plurality of acquired images and storing the plurality of acquired images; based on a second function corresponding to the second type touch input being performed based on the acquired touch input of the user, allocating a second label corresponding to the second type touch input to the plurality of acquired images and storing the plurality of acquired images; and retraining the neural network model based on the plurality of acquired images to which the first label is allocated and the plurality of acquired images to which the second label is allocated.

The method may further include: based on the plurality of images corresponding to the acquired touch input of the user being acquired, acquiring a first similarity between the plurality of acquired images and the plurality of first images and a second similarity between the plurality of acquired images and the plurality of second images; and acquiring a plurality of first input images having the first similarity of at least a predetermined value among the plurality of first images, and acquiring a plurality of second input images having the second similarity of at least the predetermined value among the plurality of second images, and the identifying the type of the acquired touch input of the user may include inputting, to the trained neural network model, the plurality of acquired images, the plurality of first input images, and the plurality of second input images.

Each of the first similarity and the second similarity may be acquired based on at least one of an area, a shape, and a change over time of a region corresponding to the touch input included in each of the plurality of acquired images, the plurality of first images, and the plurality of second images.

The method may further include retraining the neural network model based on the plurality of acquired images, the plurality of first images, and the plurality of second images.

A function corresponding to the second type touch input may include a function of displaying at least one user interface (UI) element on the touch screen, and the at least one UI element may include at least one of a first UI element for adjusting a volume of a speaker and a second UI element for powering off the electronic device.

The identifying the type of the acquired touch input of the user may include: allocating the plurality of acquired images to a plurality of first channels, the plurality of first images to a plurality of second channels, and the plurality of second images to a plurality of third channels, respectively; and acquiring input data for the trained neural network model by merging the plurality of first channels, the plurality of second channels, and the plurality of third channels with one another.

The identifying the type of the acquired touch input of the user may include: acquiring a first probability that the acquired touch input of the user corresponds to the first type touch input, and a second probability that the acquired touch input of the user corresponds to the second type touch input by inputting, to the trained neural network model, the plurality of acquired images, the plurality of first images, and the plurality of second images, and the type of the acquired touch input of the user may be identified as the first type touch input based on the first probability being greater than a predetermined probability, and the type of the touch acquired input of the user may be identified as the second type touch input when the second probability being greater than the predetermined probability.

According to an aspect of the disclosure, an electronic device includes: a touch screen; a memory storing at least one instruction; and a processor configured to execute the at least one instruction to: acquire a plurality of first images corresponding to a first type touch input for touching the touch screen with a pressure less than a predetermined pressure, and a plurality of second images corresponding to a second type touch input for touching the touch screen with a pressure greater than the predetermined pressure, store the plurality of first images and the plurality of second images in the memory, train a neural network model for identifying a type of a touch input of a user based on the plurality of first images and the plurality of second images, based on acquiring a touch input of the user through the touch screen, acquire a plurality of images corresponding to the acquired touch input of the user, identify a type of the acquired touch input of the user by inputting, to the trained neural network model, the plurality of acquired images, the plurality of first images, and the plurality of second images, and perform a function corresponding to the acquired touch input of the user based on the identified type of the touch input.

The processor may be further configured to execute the at least one instruction to: display, on the touch screen, a user interface (UI) element for guiding the touch input of the user corresponding to each of the first type touch input and the second type touch input, and based on detecting the touch input of the user for touching the UI element, generate a plurality of images corresponding to the detected touch input.

The processor may be further configured to execute the at least one instruction to display, on the touch screen, a first UI element for guiding the first type touch input and a second UI element for guiding the second type touch input, and a size of the second UI element may be greater than a size of the first UI element.

The processor may be further configured to execute the at least one instruction to: based on a function corresponding to the first type touch input being performed based on the acquired touch input of the user, allocate a first label corresponding to the first type touch input to the plurality of acquired images and store the plurality of acquired images, based on a function corresponding to the second type touch input being performed based on the acquired touch input of the user, allocate a second label corresponding to the second type touch input to the plurality of acquired images and store the plurality of acquired images, and retrain the neural network model based on the plurality of acquired images to which the first label is allocated and the plurality of acquired images to which the second label is allocated.

The processor may be further configured to execute the at least one instruction to: based on acquiring the plurality of images corresponding to the acquired touch input of the user, acquire a first similarity between the plurality of acquired images and the plurality of first images and a second similarity between the plurality of acquired images and the plurality of second images, acquire a plurality of first input images having the first similarity of at least a predetermined value among the plurality of first images, and acquire a plurality of second input images having the second similarity of at least the predetermined value among the plurality of second images, and identify the type of the acquired touch input of the user by inputting, to the trained neural network model, the plurality of acquired images, the plurality of first input images, and the plurality of second input images.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2B is a table showing a label value according to an embodiment of the present disclosure;

DETAILED DESCRIPTION

Figure 1:
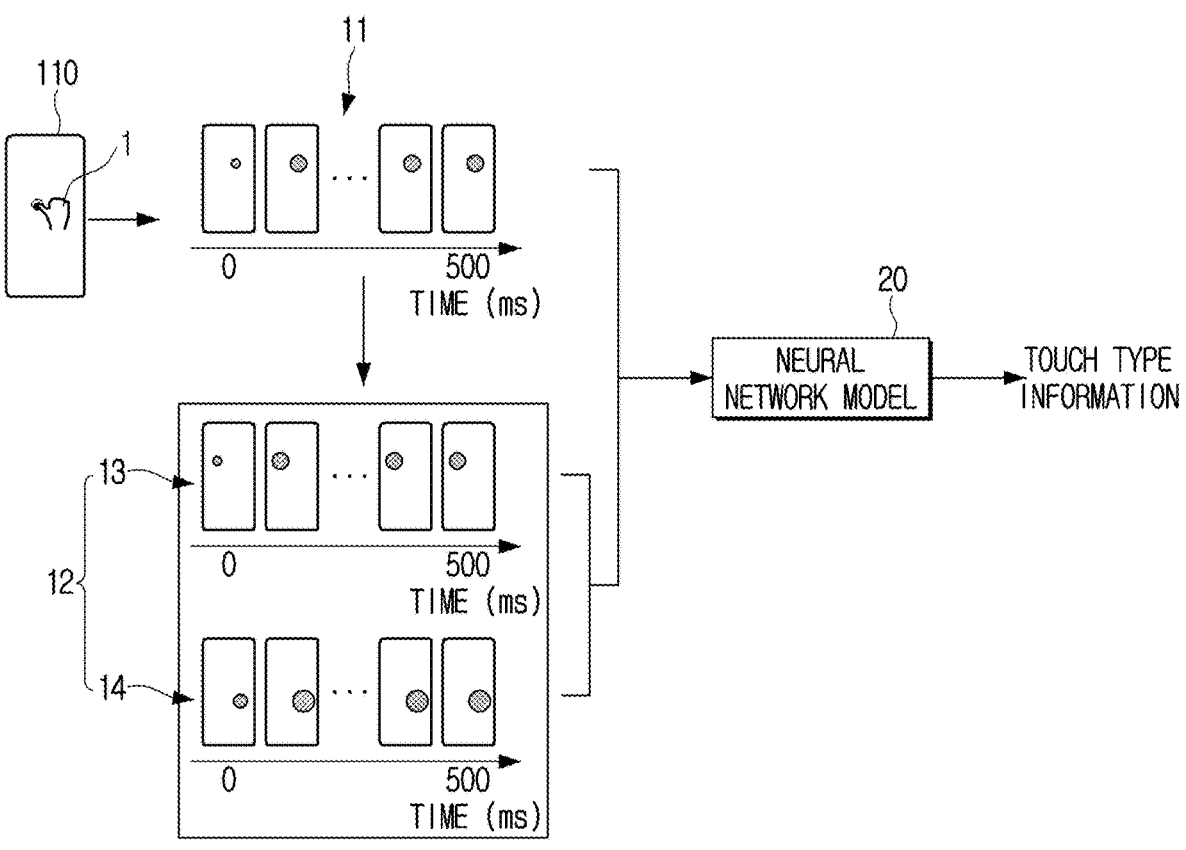
FIG. 1 is a view for explaining an operation of an electronic device according to an embodiment of the present disclosure.

Terms used in this specification will be briefly described, and the present disclosure will then be described in detail.

General terms that are widely used currently are selected as the terms used in embodiments of the present disclosure in consideration of their functions in the present disclosure, and may be changed based on an intention of those skilled in the art or a judicial precedent, emergence of a new technique, or the like. In addition, in a specific case, terms arbitrarily chosen by an applicant may exist. In this case, the meanings of such terms are mentioned in detail in corresponding description portions of the present disclosure. Therefore, the terms used in the present disclosure need to be defined on the basis of the meanings of the terms and the contents throughout the present disclosure rather than simple names of the terms.

The present disclosure may be variously modified and have several embodiments, and specific embodiments of the present disclosure will be shown in the drawings and described in detail in the detailed description. However, it is to be understood that the present disclosure is not limited to the specific embodiments, and includes all modifications, equivalents, and substitutions without departing from the scope and spirit of the present disclosure. When it is decided that a detailed description for the known art related to the present disclosure may obscure the gist of the present disclosure, the detailed description will be omitted.

Terms "first," "second," and the like, may be used to describe various components. However, the components are not to be construed as being limited by these terms. The terms are used only to distinguish one component from another component.

A term of a singular number may include its plural number unless explicitly indicated otherwise in the context. It is to be understood that a term "include," "formed of," or the like used in the specification specifies the presence of features, numerals, steps, operations, components, parts or combinations thereof, which is mentioned in the specification, and does not preclude the presence or addition of one or more other features, numerals, steps, operations, components, parts or combinations thereof.

Hereinafter, the embodiments of the present disclosure will be described in detail with reference to the accompanying drawings so that those skilled in the art to which the present disclosure pertains may easily practice the present disclosure. However, the present disclosure may be modified in various different forms, and is not limited to the embodiments provided in the specification. In addition, in the drawings, portions unrelated to the description are omitted to clearly describe the present disclosure, and similar portions are denoted by similar reference numerals throughout the specification.

FIG. 1 is a view for explaining an operation of an electronic device according to an embodiment of the present disclosure.

An electronic device 100 may acquire a touch input 1 of a user through a touch screen 110. The electronic device 100 may then acquire a plurality of images 11 based on the touch input 1. The electronic device 100 may generate the plurality of images 11 based on signals acquired from a plurality of touch sensors that are positioned in the touch screen 110 for a predetermined time. For example, the electronic device 100 may generate images of 15 frames at regular time intervals for 0.5 seconds. That is, the electronic device 100 may generate the plurality of images 11 corresponding to the touch input 1 at a sampling rate (or sampling period) of 30 Hz. Each of the plurality of images 11 may include a region corresponding to the touch input 1. Here, the plurality of images 11 may refer to grayscale images. The plurality of images 11 may be hereinafter referred to as an image set 11 for convenience of description.

The electronic device 100 may acquire a plurality of images included in individual data 12 of the user based on the image set 11. The individual data 12 may be data including information on the touch input 1 of the user, and stored in a user database. The individual data 12 may include the plurality of images (or image sets) generated based on the acquired touch input of the user through the touch screen 110. In addition, the individual data 12 may include the image set for each touch type of the user. Here, the touch type may include a first type touch input for touching the touch screen 110 with a pressure less than a predetermined (or threshold) pressure, and a second type touch input for touching the touch screen 110 with a pressure greater than the predetermined pressure.

The electronic device 100 may acquire an image set most similar to the touch input 1 for each touch type among the plurality of image sets included in the individual data 12. For example, the electronic device 100 may acquire a plurality of first images (or first image set) 13 corresponding to the first type touch input and a plurality of second images (or second image set) 14 corresponding to the second type touch input. A method of acquiring the first image set 13 or the second image set 14 is described below in more detail with reference to FIG. 6.

The electronic device 100 may input the image set 11, the first image set 13, and the second image set 14 to a neural network model 20 to thereby acquire touch type information corresponding to the touch input 1. The touch type information may refer to a probability that the touch input 1 corresponds to each touch type or a label corresponding to each touch type. As described above, the touch type may include the first type touch input for touching the touch screen 110 with the pressure less than the predetermined pressure and the second type touch input for touching the touch screen 110 with the pressure greater than the predetermined pressure. However, this configuration is only an embodiment, and the touch type according to the present disclosure is not limited thereto. In the present disclosure, the touch corresponding to the above-described first type is referred to as a long touch, and the touch corresponding to the second type is referred to as a force touch, respectively. In addition, the electronic device 100 may identify various touch types such as a short touch and a swipe as well as the first type and the second type.

In the related art, an electronic device may measure a pressure corresponding to the touch input of the user by using a pressure sensor, and identify the touch type of the user based on the measured pressure. In this case, the pressure sensor is required to be installed in the touch panel, thus increasing a thickness of the touch panel and increasing a manufacturing cost thereof. On the other hand, the electronic device 100 according to one or more embodiments of the present disclosure may acquire the touch type information by inputting the touch input 1 of the user and the individual data 12 corresponding to the touch input 1 to the neural network model 20. Accordingly, the electronic device 100 may acquire accurate touch type information without the separate pressure sensor, and have a technical effect of reducing the manufacturing cost of the touch panel.

Efficiently constructing the individual data 12 improves the accuracy of the touch type information acquired through the neural network model 20. Hereinafter, a method of constructing the individual data 12 is described.

Figure 2A:
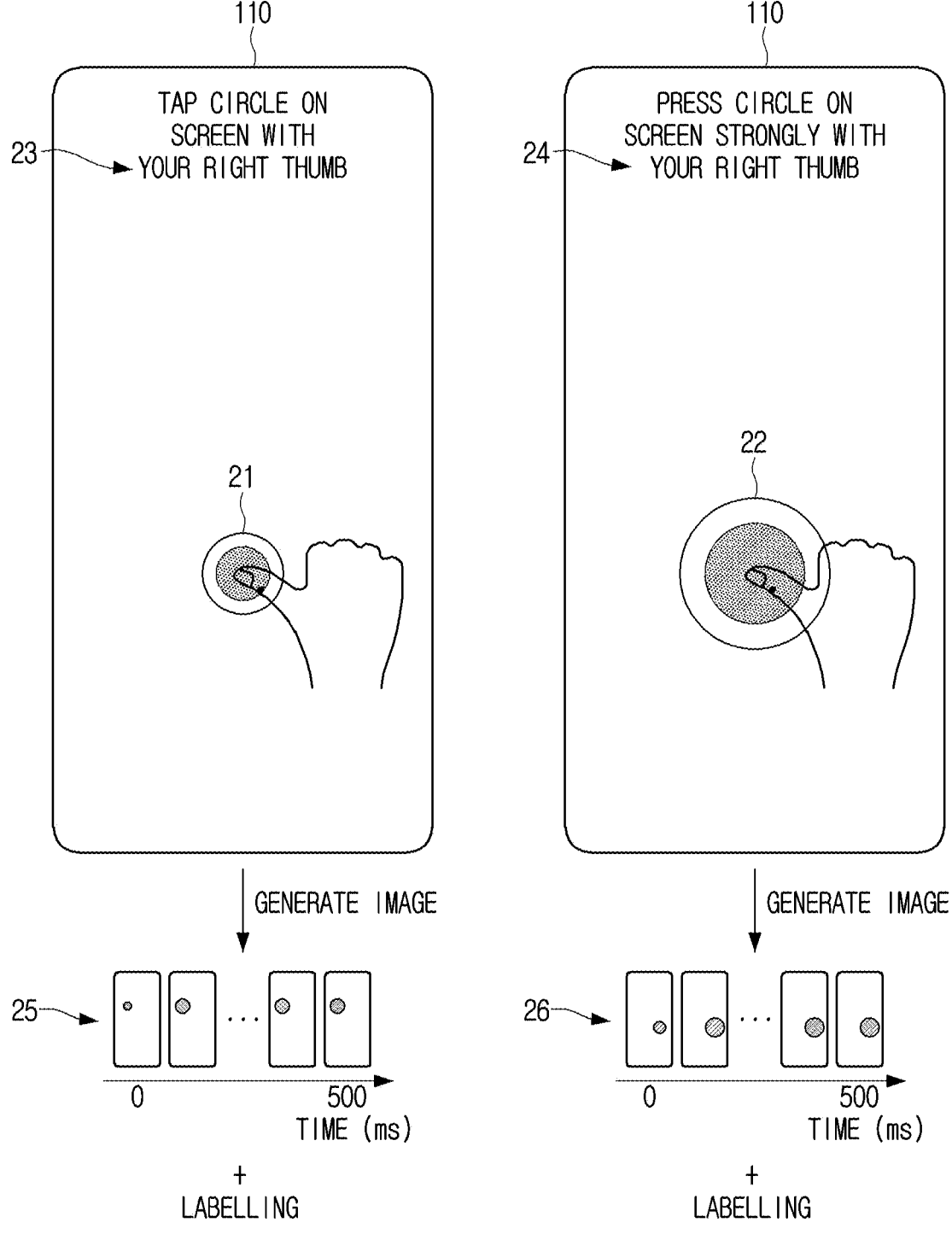
FIG. 2A is a view for explaining a method of constructing individual data according to an embodiment of the present disclosure.

FIG. 2A is a view for explaining the method of constructing the individual data according to an embodiment of the present disclosure. FIG. 2B is a table showing a label value according to an embodiment of the present disclosure.

Referring to FIG. 2A, the electronic device 100 may display user interface (UI) elements (or objects) 21 and 22 for guiding the touch input of the user corresponding to the plurality of touch types on the touch screen 110. The electronic device 100 may display the UI elements 21 and 22 and guide messages 23 and 24 for guiding a touch input of the user corresponding to a specific touch type for each finger. For example, the electronic device 100 may display a first UI element 21 for guiding a touch input (that is, first type touch input) for pressing the touch screen 110 with the pressure less than the predetermined pressure by using a "right thumb." In addition, the electronic device 100 may display a second UI element 22 for guiding the touch input (that is, second type touch input) for pressing the touch screen 110 with the pressure greater than the predetermined pressure by using the "right thumb." In this way, the electronic device 100 may display the UI elements 21 and 22, and the user may touch the UI elements 21 and 22 with each finger with the pressure greater than the predetermined pressure or with the pressure less than the predetermined pressure.

Accordingly, the electronic device 100 may obtain the touch type information for each finger of the user. In detail, the electronic device 100 may generate an image corresponding to a touch input when acquiring the touch input of the user for touching the UI element 21 or 22. For example, the electronic device 100 may generate an image set 25 when acquiring the touch input for touching the first UI element 21. In addition, the electronic device 100 may generate an image set 26 when acquiring the touch input for touching the second UI element 22. Here, the image sets 25 and 26 may each include the region corresponding to the touch input of the user.

In addition, the electronic device 100 may allocate a label value corresponding to a user input to the generated image. Here, a label may include a class label and a finger label. The class label may refer to a label corresponding to the above-described touch type, and the finger label may refer to a label corresponding to each finger. The label according to an embodiment of the present disclosure may be defined as shown in the table of FIG. 2B. For example, the electronic device 100 may allocate a label ([1, 0]) to the image set 25. In addition, the electronic device 100 may allocate a label ([2, 0]) to the image set 26.

In this way, the electronic device 100 may store the image set in the user database when the image set corresponding to each finger or each touch type of the user is generated and the label (or label value) is allocated to each image set. In addition, the electronic device 100 may train the neural network model 20 based on the individual data 12.

Figure 3:
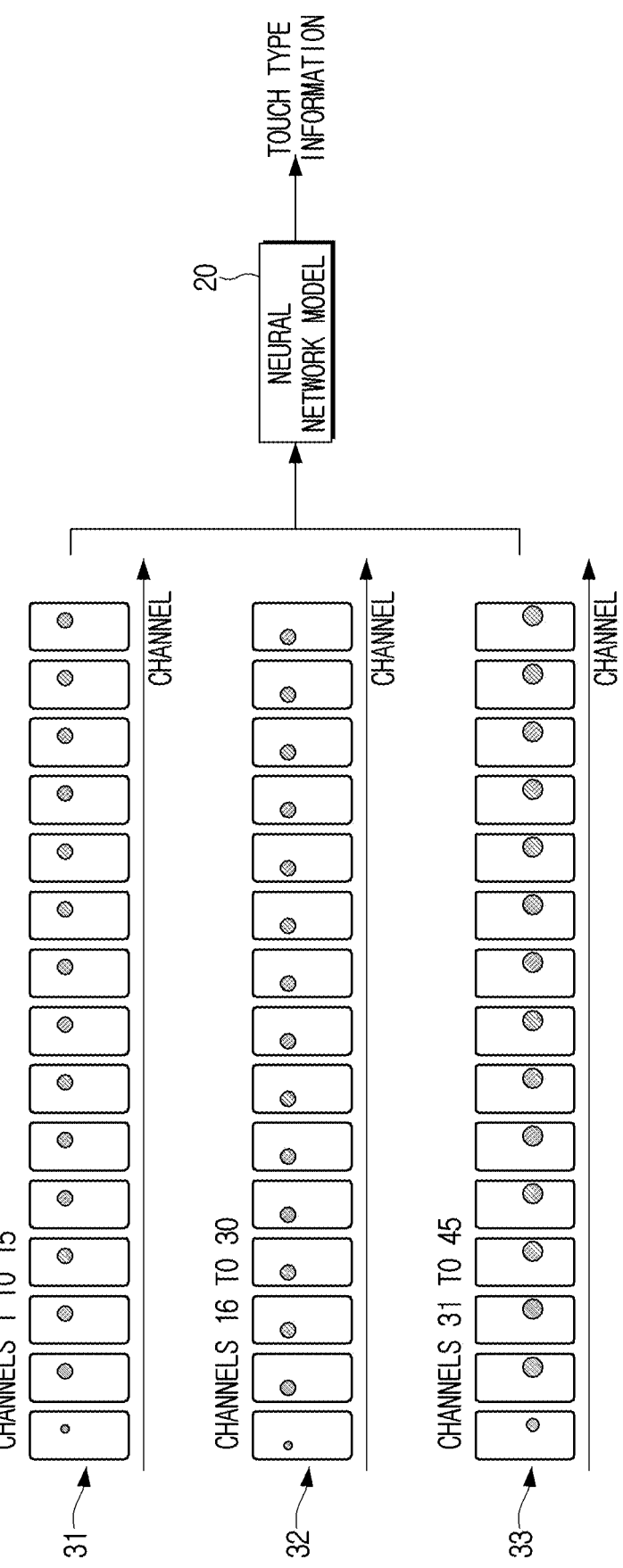
FIG. 3 is a view for explaining a method of training a neural network model according to an embodiment of the present disclosure.

FIG. 3 is a view for explaining a method of training a neural network model according to an embodiment of the present disclosure. The electronic device 100 may train the neural network model 20 for identifying the touch type based on individual data 12 and a pre-stored image set. Here, the pre-stored image set may refer to a sample image set provided by a manufacturer. The electronic device 100 may acquire arbitrary learning data from the individual data 12 stored in the user database and the pre-stored image set. For example, the electronic device 100 may acquire a first image set 31, a second image set 32, and a third image set 33. Each of the first image set 31, the second image set 32, and the third image set 33 may include a plurality of images. The first image set 31, the second image set 32, and the third image set 33 may respectively be allocated (or classified) to first channels (channels 1 to 15), second channels (channels 16 to 30), and third channels (channels 31 to 45). Here, the first channels may be channels corresponding to a current input, the second channels may be channels corresponding to the first type, and the third channels may be channels corresponding to the second type.

The electronic device 100 may acquire input data for the neural network model 20 by merging the first channels, the second channels, and the third channels with one another. The electronic device 100 may then acquire touch type information corresponding to the first image set 31 by inputting, to the neural network model, the first image set 31, the second image set 32, and the third image set 33, respectively allocated to the first channels, the second channels, and the third channels. In addition, the electronic device 100 may calculate an error value based on a predicted label based on the acquired touch type information and an actual label of the first image set 31. The electronic device 100 may train the neural network model 20 by updating a parameter (or a weight) of the neural network model 20 to minimize the error value.

The electronic device 100 may retrain the neural network model 20 when a predefined condition is satisfied. For example, the predefined condition may be determined based on whether an accumulated amount of individual data 12 stored in the user database has a threshold value or more, whether a memory capacity of the electronic device 100 has a threshold value or more, or the like.

Obtaining a large amount of individual data 12 may improve performance of the neural network model 20. To this end, the electronic device 100 may obtain the individual data 12 even while the user uses the electronic device 100.

Figure 4A:
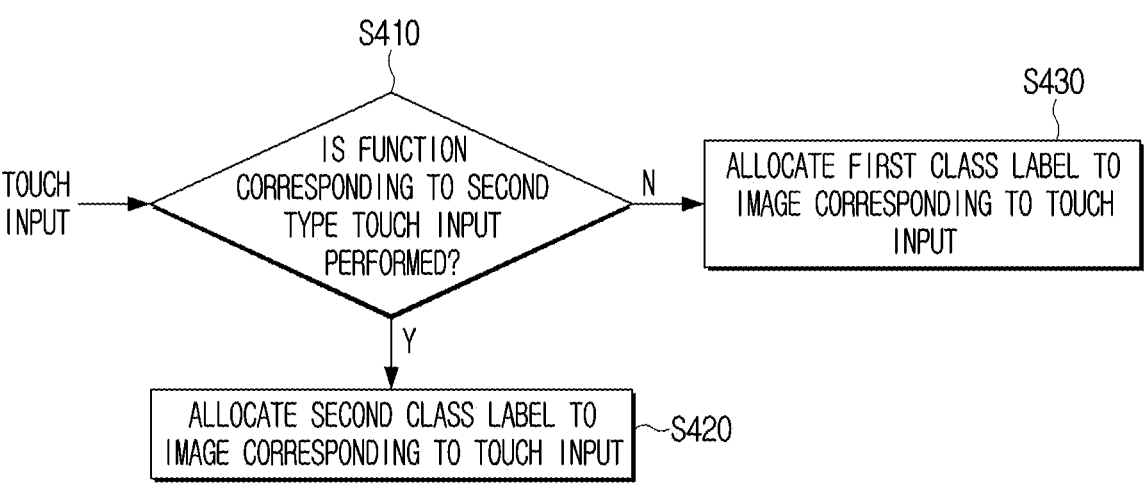
FIG. 4A is a flowchart for explaining a method of allocating a class label according to an embodiment of the present disclosure.
Figure 4B:
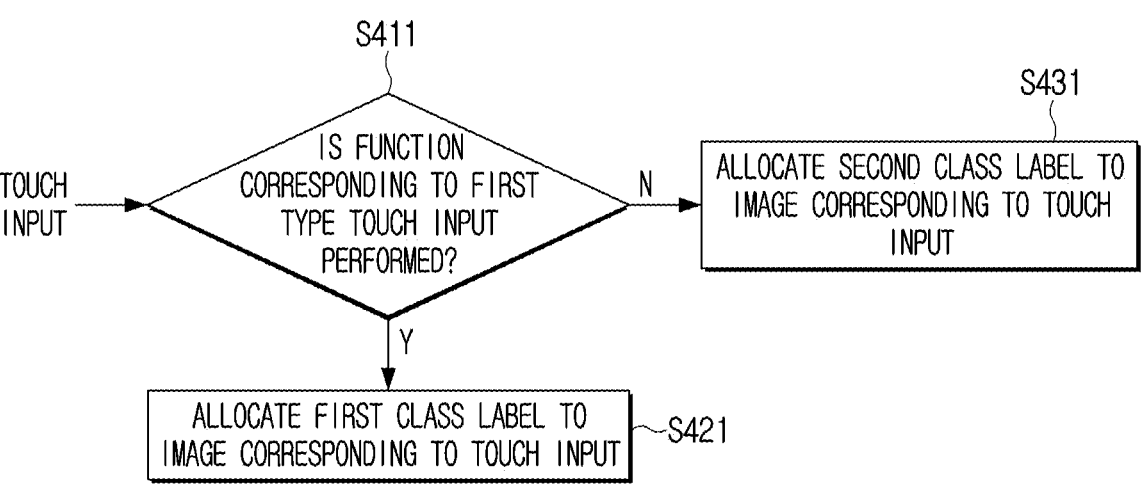
FIG. 4B is a flowchart for explaining a method of allocating a class label according to another embodiment of the present disclosure.

FIG. 4A is a flowchart for explaining a method of allocating the class label according to an embodiment of the present disclosure. It is a flowchart for explaining the method of constructing the individual data. FIG. 4B is a flowchart for explaining a method of allocating the class label according to another embodiment of the present disclosure.

Referring to FIG. 4A, the electronic device 100 may acquire the touch input of the user. The electronic device 100 may identify whether a function corresponding to the second type touch input is performed according to the acquired touch input of the user (S410). Here, the function corresponding to the second type touch input may be preset by the user. For example, the function corresponding to the second type touch input may include a function of displaying a UI element for adjusting a volume of a speaker included in the electronic device 100. Alternatively, the function corresponding to the second type touch input may include a function of transmitting a phone signal to an external device for an emergency call.

The electronic device 100 may allocate a second class label to an image corresponding to the touch input of the user when identifying that the function corresponding to the second type touch input is performed based on the touch input of the user (S420). Here, the second class label refers to a class label corresponding to the second type touch input (i.e., force touch). As described above, the electronic device 100 may generate a plurality of images based on the touch input of the user, and may allocate the second class label to the plurality of images. In addition, the electronic device 100 may store the plurality of images to which the second class label is allocated as the individual data 12.

The electronic device 100 may allocate a first class label to an image corresponding to the touch input of the user when identifying that the function corresponding to the second type touch input is not performed based on the touch input of the user (S430). Here, the first label refers to a class label corresponding to the first type touch input (i.e., long touch). As such, the electronic device 100 may allocate the class label to an image corresponding to the touch input based on whether the function corresponding to the second type touch input is performed based on the touch input.

The electronic device 100 may determine a class label to be allocated to an image corresponding to the touch input based on whether a function corresponding to the first type touch input is performed based on the touch input. Referring to FIG. 4B, the electronic device 100 may identify whether the function corresponding to the first type touch input is performed based on the touch input (S411). Here, the first type touch input refers to the long touch input, and the function corresponding to the first type touch input may be preset by the user. For example, the function corresponding to the first type touch input may be set as a function of displaying a UI element for deleting an icon displayed on the touch screen 110.

The electronic device 100 may allocate the first class label to the image corresponding to the touch input when identifying that the function corresponding to the first type touch input is performed based on the touch input (S421). On the other hand, the electronic device 100 may allocate the second class label to the image corresponding to the touch input when identifying that the function corresponding to the first type touch input is not performed based on the touch input (S431). In addition, the electronic device 100 may construct the individual data 12 by storing the image to which the class label is allocated as the individual data 12.

Figure 5:
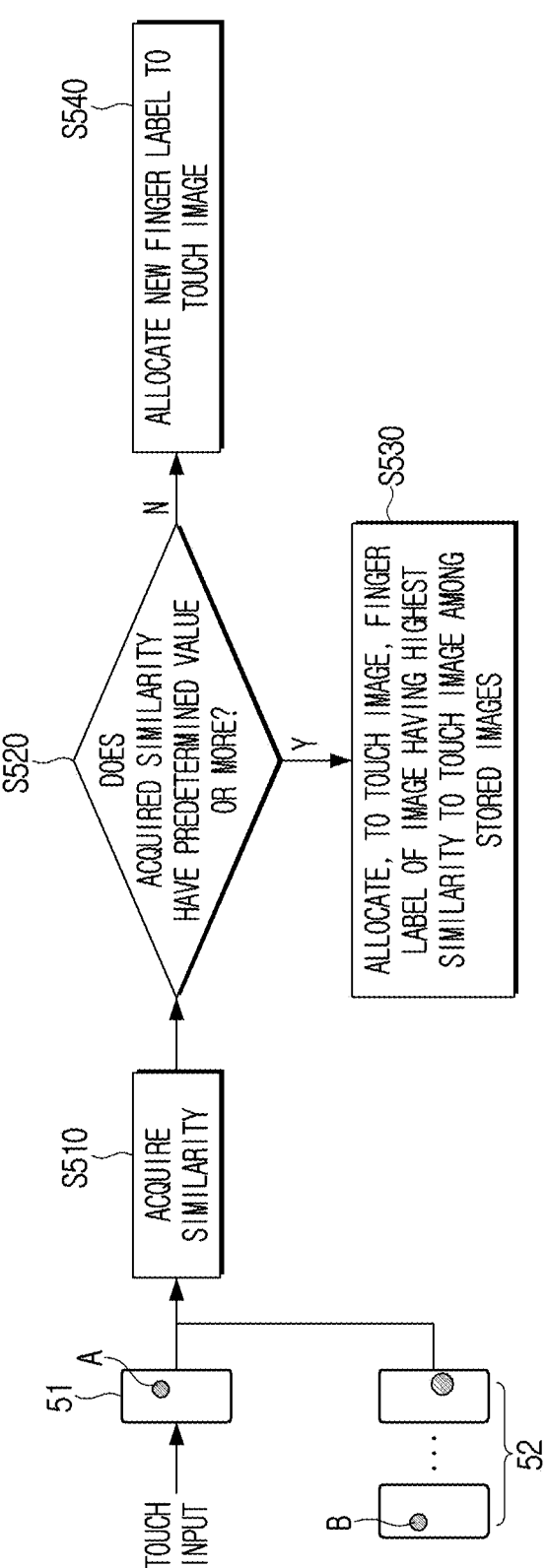
FIG. 5 is a view for explaining a method of allocating a finger label according to an embodiment of the present disclosure.

The electronic device 100 may allocate the finger label as well as the class label to the image corresponding to the touch input. FIG. 5 is a view for explaining a method of allocating the finger label according to an embodiment of the present disclosure.

The electronic device 100 may acquire an image (or touch image) 51 corresponding to the touch input when acquiring the touch input of the user. The electronic device 100 may then acquire similarity between the touch image 51 and a stored image 52 by comparing the touch image 51 with the stored image 52 in the user database (S510). Here, the stored image 52 refers to an image stored as the above-mentioned individual data 12. Accordingly, the class label and the finger label may be allocated to the stored image 52.

The electronic device 100 may acquire the similarity between the touch image 51 and the stored image 52 in various ways (S510). For example, the electronic device 100 may acquire the similarity between the touch image 51 and the stored image 52 based on a difference between an area of a first touch region "A" of the user included in the touch image 51 and an area of a second touch region "B" included in the stored image 52. Here, the first touch region "A" and the second touch region "B" may each correspond to the user input for touching the touch screen 110. For another example, the electronic device 100 may acquire the similarity between the touch image 51 and the stored image 52 by analyzing patterns of the touch image 51 and the stored image 52. For still another example, the touch image 51 and the stored image 52 may be the plurality of image sets acquired for the predetermined time (e.g., 0.5 seconds), and in this case, the electronic device 100 may acquire the similarity between the touch image 51 and the stored image 52 by comparing a change in the first touch region "A" with a change in the second touch region "B."

The electronic device 100 may acquire an image corresponding to a class label allocated to the touch image 51 among the stored images 52, and acquire similarity between the acquired image and the touch image 51. For example, the class label allocated to the touch image 51 is 1 (i.e., force touch), and in this case, the electronic device 100 may acquire an image having a class label of 1 among the stored images 52. In addition, the electronic device 100 may acquire the similarity between the touch image 51 and the stored image 52 by acquiring the similarity between the acquired image and the touch image 51.

The electronic device 100 may identify whether the acquired similarity has a predetermined value or more when acquiring the similarity between the touch image 51 and the stored image 52 (S520). The electronic device 100 may allocate, to the touch image 51, a finger label of the image having the highest similarity to the touch image 51 among the stored images 52 when identifying the acquired similarity has the predetermined value (e.g., 90%) or more (S530). For example, the electronic device 100 may allocate, to the touch image 51, a finger label (e.g., level of zero) corresponding to the right thumb when the touch image 51 has the highest similarity to the first image to which the finger label corresponding to the right thumb is allocated among the stored images 52. The electronic device 100 may identify the finger label corresponding to the image set with the highest similarity to the touch image set similarly to the above-described method even when acquiring the touch image set of the plurality of frames, and allocate the identified finger label to the touch image set.

The electronic device 100 may allocate a new finger label to the touch image 51 when identifying the acquired similarity has a value less than the predetermined value (S540). Here, the electronic device 100 may identify a user finger corresponding to the touch image 51 by inputting the finger to a finger identification model. The finger identifying model may be stored in the electronic device 100 in advance as a trained neural network model. For example, the electronic device 100 may allocate a finger label corresponding to the "ring finger of the right hand" to the touch image 51 when there is no image to which the finger label corresponding to the "ring finger of the right hand" is allocated in the stored image 52 and the finger corresponding to the touch image 51 is identified as the "ring finger of the right hand."

The electronic device 100 may store the touch image 51 to which the finger label is allocated in the user database when the finger label is allocated to the touch image (or touch image set) 51. In this way, the electronic device 100 may construct the individual data based on the touch input acquired while the user uses the electronic device 100. In addition, the electronic device 100 may retrain the neural network model 20 based on the individual data 12 as described with reference to FIG. 3.

Selecting the input data that is input to the neural network model 20 may improve the accuracy of the touch type information acquired through the neural network model 20.

Figure 6:
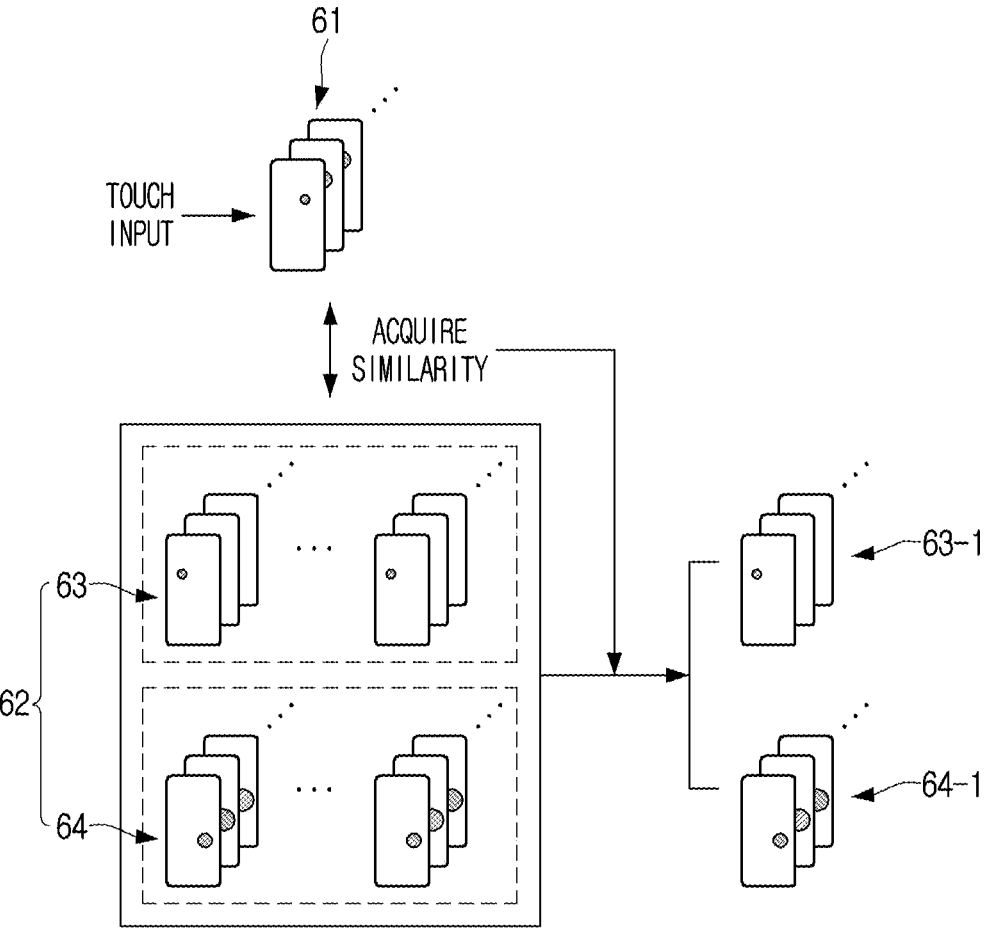
FIG. 6 is a view for explaining a method of acquiring input data according to an embodiment of the present disclosure.

FIG. 6 is a view for explaining a method of acquiring the input data according to an embodiment of the present disclosure. The electronic device 100 may acquire a touch image set 61 corresponding to the touch input when the touch input is acquired. The electronic device 100 may acquire similarity between the touch image set 61 and a plurality of image sets 62 stored in the user database. The plurality of image sets 62 may include a plurality of first image sets 63 to which the class label corresponding to the first type (i.e., long touch) is allocated and a plurality of second image sets 64 to which the class label corresponding to the second type (i.e., force touch) is allocated. The electronic device 100 may acquire similarity between the touch image set 61 and a plurality of first image sets 63. In addition, the electronic device 100 may acquire similarity between the touch image set 61 and a plurality of second image sets 64. A specific method of determining the similarity may refer to operation S510 of FIG. 5, and a detailed description thereof is omitted.

The electronic device 100 may acquire the input data for the neural network model 20 based on the similarity when acquiring the similarity between the touch image set 61 and the stored image set 62. Here, the electronic device 100 may acquire a 1-1-th image set 63-1 having the highest similarity to the touch image set 61 among the plurality of first image sets 63. In addition, the electronic device 100 may acquire a 2-1-th image set 64-1 having the highest similarity to the touch image set 61 among the plurality of second image sets 64. In addition, the electronic device 100 may acquire, as the input data, the touch image set 61, the 1-1-th image set 63-1, and the 2-1-th image set 64-1. In detail, the electronic device 100 may allocate, to the plurality of channels, the touch image set 61, the 1-1-th image set 63-1, and the 2-1-th image set 64-1, respectively. In addition, the electronic device 100 may acquire the input data for the neural network model 20 by merging the plurality of channels with one another.

The electronic device 100 may acquire the touch type information corresponding to the touch image set 61 by inputting, to the neural network model 20, the touch image set 61, the 1-1-th image set 63-1, and the 2-1-th image set 64-1, respectively allocated to the plurality of channels. The touch type information may include a first probability that the touch input corresponds to the first type touch input and a second probability that the touch input corresponds to the second type touch input. Here, the electronic device 100 may identify the type of touch input as the first type when the first probability is greater than a predetermined (or threshold) probability (e.g., 70%). On the other hand, the electronic device 100 may identify the acquired type of the touch input of the user as the second type when the second probability is greater than the predetermined probability (e.g., 70%). In addition, the electronic device 100 may perform the function corresponding to the touch input based on the acquired touch type information.

For convenience of explanation, the above description describes that the electronic device 100 identifies the touch type of a single touch input for touching the touch screen 110 with one finger, and performs a function corresponding to the single touch input based on the identified touch type. However, this configuration is only an example, and the electronic device 100 may perform a function corresponding to a multi-touch input for touching the touch screen 110 with two or more fingers. Here, the electronic device 100 may generate an image set corresponding to the multi-touch input, and acquire an input image set for the neural network model 20 among the image sets stored in the individual data based on the generated image set. In addition, the electronic device 100 may identify the touch type of the multi-touch input by inputting the generated image set and the input image set to the neural network model 20. The electronic device 100 may perform a function corresponding to the multi-touch input based on the identified touch type. For example, the electronic device 100 may display a UI element for powering off when identifying the touch type of the multi-touch input is the second type. A more detailed description thereof is provided below with reference to FIG. 7B.

Figure 7A:
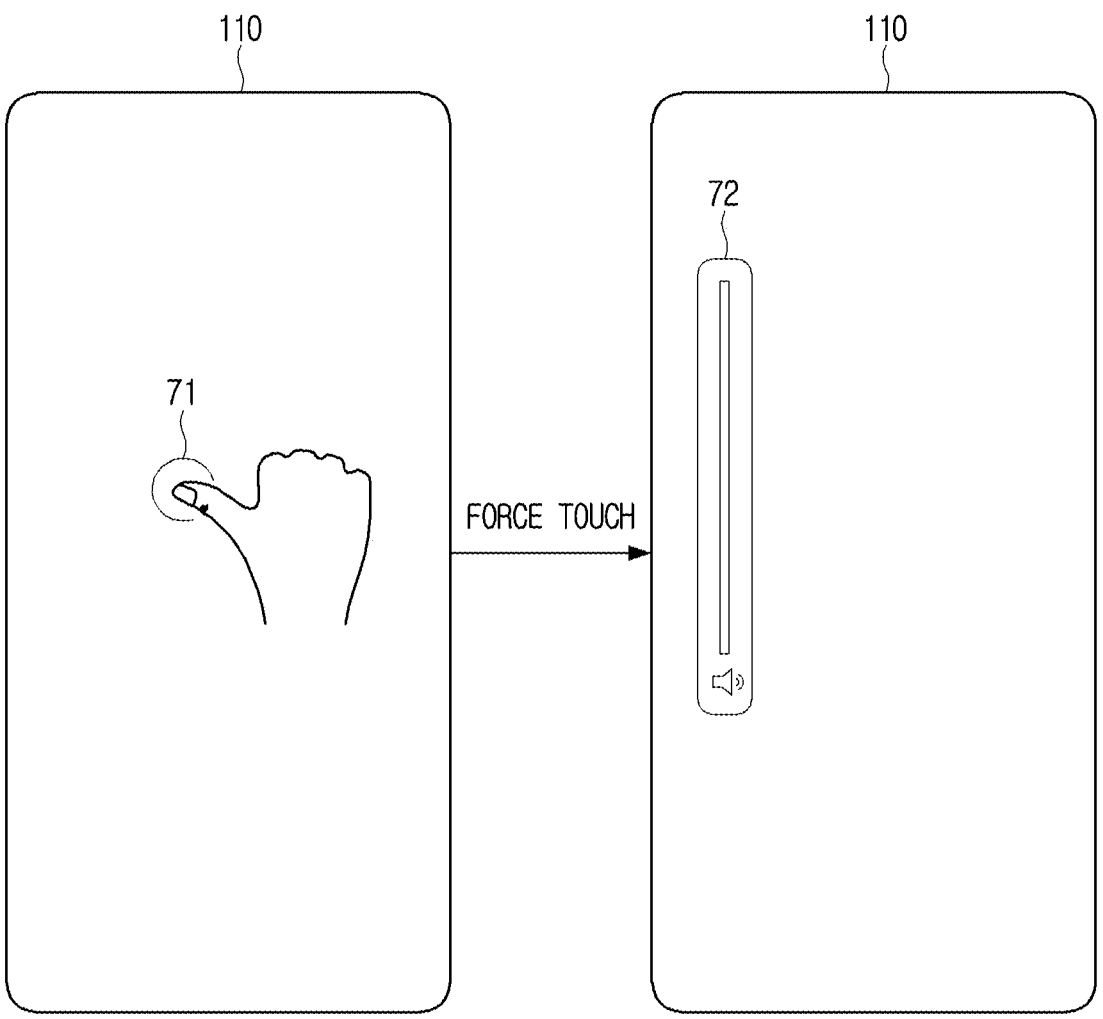
FIG. 7A is a view showing that the electronic device performs a function corresponding to a touch input according to an embodiment of the present disclosure.

FIG. 7A is a view showing that the electronic device performs the function corresponding to the touch input according to an embodiment of the present disclosure. The electronic device 100 may identify a type of the touch input 71 when acquiring the touch input 71 through the touch screen 110. For example, the electronic device 100 may display a UI element 72 for volume control when identifying that the touch input 71 is the second type (i.e., force touch).

Figure 7B:
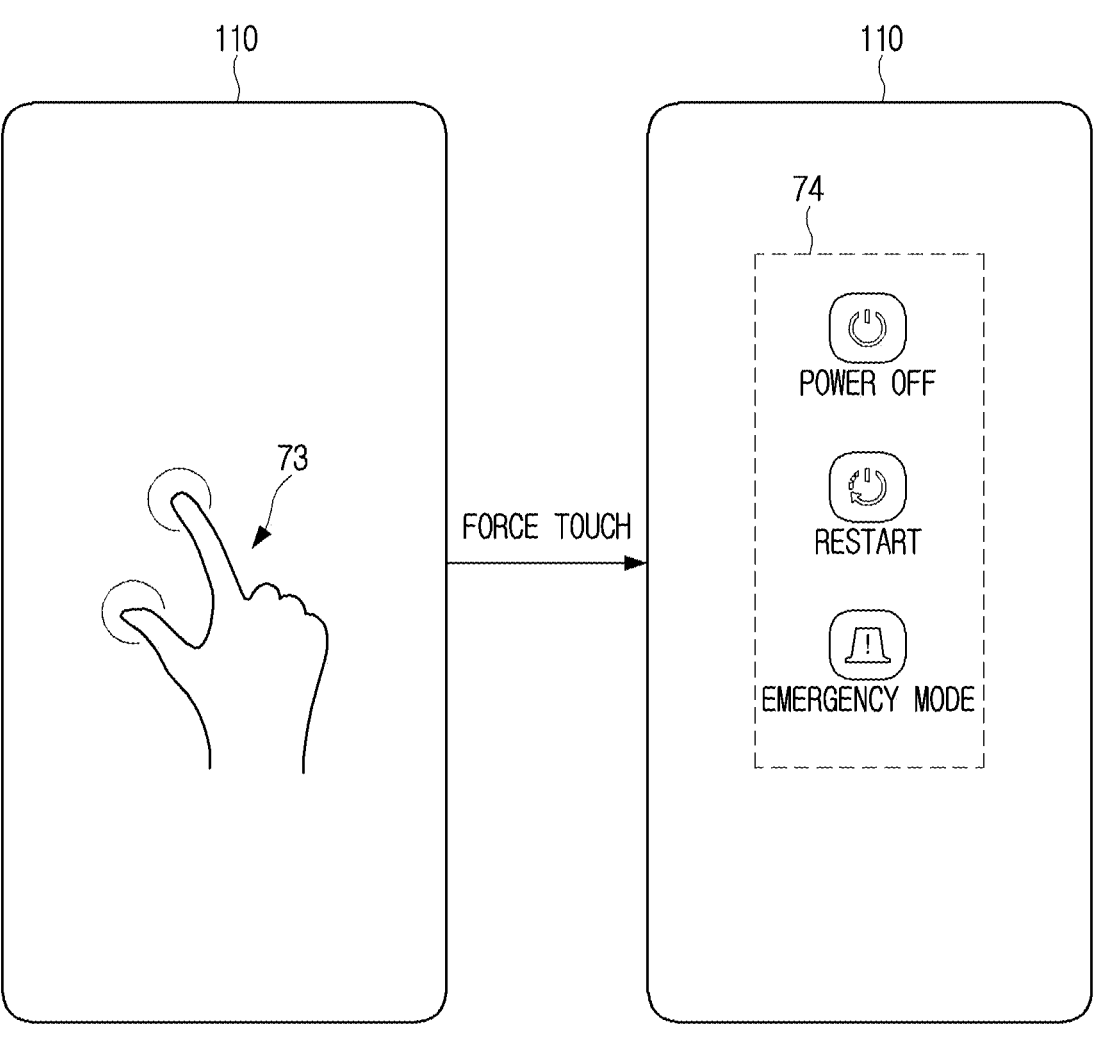
FIG. 7B is a view showing that the electronic device performs a function corresponding to a touch input according to another example of the present disclosure.

FIG. 7B is a view showing that the electronic device performs the function corresponding to the touch input according to another example of the present disclosure. The electronic device 100 may identify a type of a multi-touch input 73 when acquiring the multi-touch input 73 through the touch screen 110. For example, the electronic device 100 may display a UI element 74 for powering off the electronic device 100 when identifying that the multi-touch input 73 is the second type (i.e., force touch).

Figure 8:
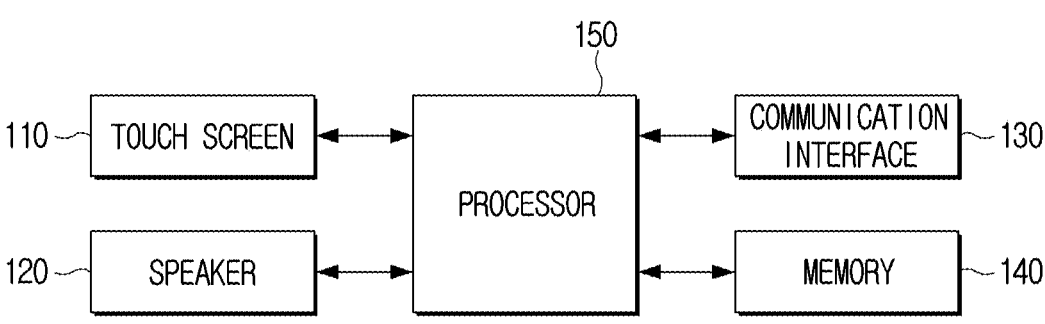
FIG. 8 is a block diagram showing a configuration of the electronic device according to an embodiment of the present disclosure.

FIG. 8 is a block diagram showing a configuration of the electronic device according to an embodiment of the present disclosure.

The electronic device 100 may include the touch screen 110, a speaker 120, a communication interface 130, a memory 140, and a processor 150.

The touch screen 110 may acquire the touch input of the user. To this end, the touch screen 110 may include the plurality of touch sensors. In addition, the touch screen 110 may display at least one UI element. For example, the touch screen 110 may display a UI element for acquiring the user input for each touch type.

The speaker 120 may output audio. For example, the processor 150 may control the touch screen 110 to display a UI element for adjusting a volume of the speaker 120 when acquiring the touch input of the user corresponding to the second touch type.

The communication interface 130 may include at least one circuit, and communicate with the various types of external devices by using various types of communication methods. The communication interface 130 may include a wireless-fidelity (Wi-Fi) chip and a Bluetooth chip. The electronic device 100 may communicate with an external server or the external device through the communication interface 130. For example, the processor 150 may generate a notification signal when acquiring the touch input of the user corresponding to the second type, and transmit the generated notification signal to the external server through the communication interface 130.

The memory 140 may store an operating system (OS) for controlling overall operations of components of the electronic device 100, and instructions or data related to the components of the electronic device 100. To this end, the memory 140 may be implemented as a non-volatile memory (e.g., hard disk, solid state drive (SSD), or flash memory), a volatile memory, or the like. In particular, the memory 140 may store a neural network model for identifying the type of touch input. The neural network model may be executed by an existing general-purpose processor (e.g., central processing unit (CPU)) or a separate artificial intelligence (AI)-only processor (e.g., graphic processing unit (GPU) or neural processing unit (NPU)). In addition, the memory 140 may include the user database including the individual data of the user.

The processor 150 may control overall operations of the electronic device 100.

For example, the processor 150 may control the touch screen 110 to display a UI element for guiding the user input for each touch type. The UI element may include a first UI element for guiding the first type touch input and a second UI element for guiding the touch input of the user corresponding to the second type touch input. Here, the second UI element may have a size greater than that of the first UI element.

The processor 150 may acquire the first type touch input and the second type touch input through the touch screen 13
14

110. In addition, the processor 150 may generate a plurality of first images corresponding to the first type touch input and a plurality of second images corresponding to the second type touch input. The processor 150 may allocate a label corresponding to the first type to the plurality of first images, allocate a label corresponding to the second type to the plurality of second images, and store the allocated labels in the memory 140. In addition, the processor 150 may train the neural network model for identifying the touch type based on the plurality of first and second images to which the labels are allocated.

The processor 150 may acquire a plurality of images corresponding to the acquired touch input of the user when acquiring the touch input of the user through the touch screen 110. The processor 150 may acquire a plurality of first input images having the highest similarity to the acquired image among the plurality of first images stored in the memory 140. In addition, the processor 150 may acquire a plurality of second input images having the highest similarity to the acquired image among the plurality of second images stored in the memory 140. The processor 150 may then identify the touch type corresponding to the touch input of the user by inputting, to the neural network model, plurality of acquired images, the plurality of first input images and the second input image stored in the memory 140.

The processor 150 may acquire first similarity between the acquired plurality of images and the plurality of first images; and second similarity between the plurality of acquired images and the plurality of second images based on at least one of the area, shape, and change over time of a region corresponding to the touch input included in each of the plurality of acquired images, the plurality of first images, and the plurality of second images.

The processor 150 may allocate the first label corresponding to the first type touch input to the plurality of acquired images, and store the plurality of acquired images in the memory 140 when the function corresponding to the first type is performed based on the touch input of the user. In addition, the processor 150 may allocate the second label corresponding to the second type touch input to the plurality of acquired images to obtain a plurality of acquired images, and store the plurality of acquired images in the memory 140 when the function corresponding to the second type is performed based on the touch input of the user. The processor 150 may then retrain the neural network model based on the plurality of images to which the first label and the second label are respectively allocated. In this way, it is possible to improve the performance of the neural network model.

The processor 150 may acquire the input data for the neural network model based on the image corresponding to the touch input of the user, the first input image, and the second input image. The processor 150 may acquire the input data by respectively allocating, to the plurality of channels, the image corresponding to the touch input of the user, the first input image, and the second input image, and merging the plurality of channels with one another. In addition, the processor 150 may identify the touch type corresponding to the touch input of the user by inputting the input data to the neural network model.

The processor 150 may perform the function corresponding to the touch input of the user based on the identified type of the touch input. The processor 150 may display at least one UI element on the touch screen 110. For example, the processor 150 may control the touch screen 110 to display at least one of the first UI element for adjusting the volume of the speaker 120 and the second UI element for powering off the electronic device 100.

In particular, functions related to artificial intelligence according to the present disclosure may be performed through the processor 150 and the memory 140. The processor 150 may include one or more processors. In this case, each of the one or more processors may be a general-purpose processor such as the central processing unit (CPU), an application processor (AP) or a digital signal processor (DSP), a graphics-only processor such as the graphic processing unit (GPU) or a vision processing unit (VPU), or the artificial intelligence-only processor such as the neural processing unit (NPU). The one or more processors perform control to process the input data based on a predefined operation rule or the artificial intelligence model, stored in the memory 140. Alternatively, the one or more processors may be the AI-only processors, and in this case, the AI-only processor may be designed to have a hardware structure specialized for processing a specific AI model.

The predefined operation rule or artificial intelligence model may be obtained by learning. Here, to be obtained by the learning may indicate that a basic artificial intelligence model performs learning by using a number of learning data, based on a learning algorithm, thereby obtaining the predefined operation rule or artificial intelligence model, set to perform a desired feature (or purpose). Such learning may be performed by a device itself in which the artificial intelligence is performed according to the present disclosure, or by a separate server/system. For example, the learning algorithm may be supervised learning, unsupervised learning, semi-supervised learning or reinforcement learning, and is not limited thereto.

The AI model may be obtained through the learning. Here, to be obtained by the learning may indicate that the basic artificial intelligence model performs the learning by using a number of learning data, based on the learning algorithm, thereby obtaining the predefined operation rule or artificial intelligence model, set to perform the desired feature (or purpose). The artificial intelligence model may include a plurality of neural network layers. The plurality of neural network layers may each have a plurality of weight values, and perform a neural network operation by using an operation between an operation result of a previous layer and the plurality of weights. The plurality of weights of the plurality of neural network layers may be optimized by a learning result of the artificial intelligence model. For example, the plurality of weights may be updated to reduce or minimize a loss value or a cost value, acquired by the artificial intelligence model during a learning process.

The artificial neural network may include a deep neural network (DNN), and include, for example, convolutional neural network (CNN), the deep neural network (DNN), the recurrent neural network (RNN), a generative adversarial network (GAN), a restricted Boltzmann machine (RBM), a deep belief network (DBN), a bidirectional recurrent deep neural network (BRDNN) or a deep q-network, etc., and is not limited thereto.

Figure 9:
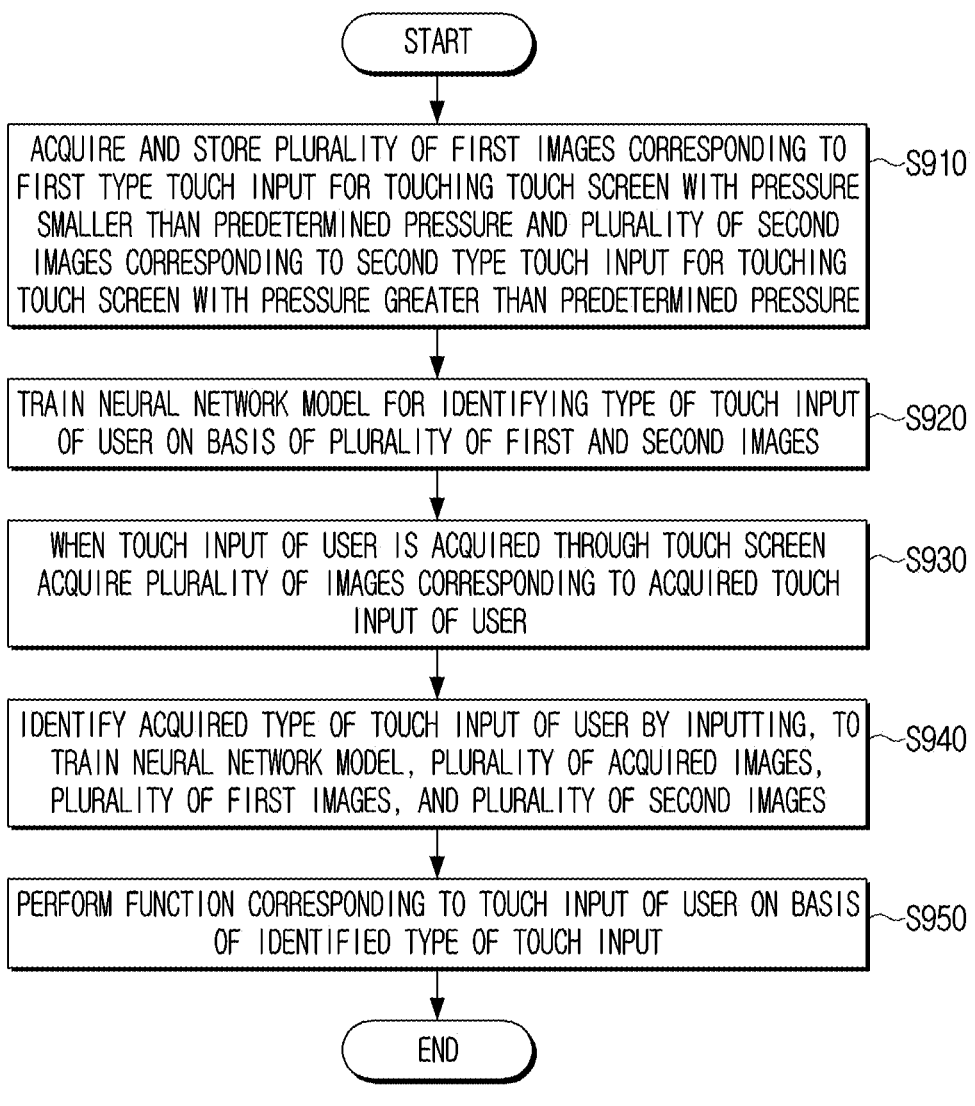
FIG. 9 is a view for explaining a control method of an electronic device according to another embodiment of the present disclosure.

FIG. 9 is a view for explaining a control method of an electronic device according to another embodiment of the present disclosure.

An electronic device 100 may acquire and store a plurality of first images corresponding to first type touch input for touching a touch screen with a pressure less than a predetermined pressure and a plurality of second images corresponding to second type touch input for touching the touch screen with a pressure greater than the predetermined pressure (S910). The electronic device 100 may display a user interface (UI) element for guiding a first type touch input and a second type touch input. In addition, the electronic device 100 may allocate a first label and a second label respectively to the plurality of first images and the plurality of second images.

The electronic device 100 may train a neural network model for identifying a type of a touch input of a user based on the plurality of first and second images (S920). The electronic device 100 may train the neural network model for identifying the touch type based on the plurality of first and second images to which the first label and the second label are allocated.

The electronic device 100 may acquire a plurality of images corresponding to the acquired touch input of the user when the touch input of the user is acquired through the touch screen (S930). In addition, the electronic device 100 may acquire a plurality of first input images having the highest similarity to the plurality of acquired images among the plurality of first images. In addition, the electronic device 100 may acquire a plurality of second input images having the highest similarity to the plurality of acquired images among the plurality of second images.

The electronic device 100 may identify the acquired type of the touch input of the user by inputting, to the trained neural network model, the plurality of acquired images, the plurality of first images, and the plurality of second images (S940). Here, the electronic device 100 may identify the acquired type of the touch input of the user by inputting, to the trained neural network model, the plurality of acquired images, the plurality of first images, and the plurality of second images. The electronic device 100 may perform a function corresponding to the touch input of the user based on the identified type of the touch input (S950).

The various embodiments of the present disclosure described above may be implemented in a computer or a computer-readable recording medium using software, hardware, or a combination of software and hardware. In some cases, the embodiments described in the present disclosure may be implemented by the processor itself. According to a software implementation, the embodiments such as procedures and functions described in the present disclosure may be implemented by separate software modules. Each of the software modules may perform one or more functions and operations described in the present disclosure.

Computer instructions for performing processing operations according to the various embodiments of the present disclosure described above may be stored in a non-transitory computer-readable medium. The computer instructions stored in the non-transitory computer-readable medium allow a specific machine to perform the processing operations according to the various embodiments described above when they are executed by a processor thereof.

The non-transitory computer-readable medium is not a medium that stores data therein for a while, such as a register, a cache, or a memory, and indicates a medium that semi-permanently stores data therein and is readable by the machine. A specific example of the non-transitory computer-readable medium may include a compact disk (CD), a digital versatile disk (DVD), a hard disk, a Blu-ray disk, a universal serial bus (USB), a memory card, a read-only memory (ROM) or the like.

A machine-readable storage medium may be provided in the form of a non-transitory storage medium. Here, the "non-transitory storage medium" may refer to a tangible device and only indicate that this storage medium does not include a signal (e.g., electromagnetic wave), and this term does not distinguish a case where data is stored semi-permanently in the storage medium and a case where data is temporarily stored in the storage medium from each other. For example, the "non-transitory storage medium" may include a buffer in which data is temporarily stored.

According to another embodiment, the method according to the various examples disclosed in the present disclosure may be included and provided in a computer program product. The computer program product may be traded as a product between a seller and a purchaser. The computer program product may be distributed in a form of the storage medium (e.g., compact disc read only memory (CD-ROM)) that may be read by a machine, or may be distributed online (e.g., downloaded or uploaded) through an application store (e.g., PlayStore™) or directly between two user devices (e.g., smartphones). In case of the online distribution, at least a part of the computer program product (e.g., downloadable app) may be at least temporarily stored in the machine-readable storage medium such as a memory of a server of a manufacturer, a server of an application store or a relay server, or be temporarily provided.

Although certain embodiments are shown and described in the present disclosure, the present disclosure is not limited to the above-mentioned specific embodiments, and may be variously modified by those skilled in the art to which the present disclosure pertains without departing from the gist of the present disclosure as claimed in the accompanying claims. These modifications should also be understood to fall within the scope and spirit of the present disclosure.

What is claimed is:

1. A control method of an electronic device, the control method comprising:

acquiring, for a plurality of fingers of a user, a plurality of first images corresponding to a first type touch input for touching a touch screen of the electronic device with a pressure less than a predetermined pressure, and a plurality of second images corresponding to a second type touch input for touching the touch screen with a pressure greater than the predetermined pressure, the second type touch input having a greater area of a region corresponding to a touch input than the first type touch input, wherein the acquiring the plurality of first images and the plurality of second images comprises:

displaying, on the touch screen, a first user interface (UI) element for guiding the first type touch input and a second UI element for guiding the second type touch input, wherein a size of the second UI element is greater than a size of the first UI element;

based on detecting a user touch input for touching the first UI element, generating the plurality of first images; and based on detecting the user touch input for touching the second UI element, generating the plurality of second images;

training a neural network model for identifying a type of the user touch input of the user based on the plurality of first images and the plurality of second images to obtain a trained neural network model;

based on acquiring the user touch input through the touch screen, acquiring a plurality of input images corresponding to the user touch input;

identifying the type of the user touch input by inputting, to the trained neural network model, the plurality of input images, the plurality of first images, and the plurality of second images;

based on the type of the user touch input being the first type touch input, performing a first function; and based on the type of the user touch input being the second type touch input, performing a second function different from the first function.

2. The control method of claim 1, further comprising:

based on the first function corresponding to the first type touch input being performed based on the user touch input, allocating a first label corresponding to the first type touch input to the plurality of input images and storing the plurality of input images;

based on the second function corresponding to the second type touch input being performed based on the user touch input, allocating a second label corresponding to the second type touch input to the plurality of input images and storing the plurality of input images; and retraining the neural network model based on the plurality of input images to which the first label is allocated and the plurality of input images to which the second label is allocated.

3. The control method of claim 1, further comprising:

acquiring a first similarity between the plurality of input images and the plurality of first images and a second similarity between the plurality of input images and the plurality of second images; and acquiring a plurality of first input images having the first similarity of at least a predetermined value among the plurality of first images, and acquiring a plurality of second input images having the second similarity of at least the predetermined value among the plurality of second images, wherein the identifying the type of the user touch input comprises inputting, to the trained neural network model, the plurality of input images, the plurality of first input images, and the plurality of second input images.

4. The control method of claim 3, wherein each of the first similarity and the second similarity is acquired based on at least one of the area, a shape, and a change over time of the region corresponding to the touch input included in each of the plurality of input images, the plurality of first images, and the plurality of second images.

5. The control method of claim 3, further comprising retraining the neural network model based on the plurality of input images, the plurality of first images, and the plurality of second images.

6. The control method of claim 1, wherein the second function corresponding to the second type touch input comprises a function of displaying at least one user interface (UI) element on the touch screen, and wherein the at least one UI element comprises at least one of a first function UI element for adjusting a volume of a speaker and a second function UI element for powering off the electronic device.

7. The control method of claim 1, wherein the identifying the type of the user touch input comprises:

allocating the plurality of input images to a plurality of first channels, the plurality of first images to a plurality of second channels, and the plurality of second images to a plurality of third channels, respectively; and acquiring input data for the trained neural network model by merging the plurality of first channels, the plurality of second channels, and the plurality of third channels with one another.

8. The control method of claim 1, wherein the identifying the type of the user touch input comprises:

acquiring a first probability that the user touch input corresponds to the first type touch input, and a second probability that the user touch input corresponds to the second type touch input by inputting, to the trained neural network model, the plurality of input images, the plurality of first images, and the plurality of second images, and wherein the type of the user touch input is identified as the first type touch input based on the first probability being greater than a predetermined probability, and the type of the user touch input is identified as the second type touch input when the second probability being greater than the predetermined probability.

9. An electronic device comprising:

a touch screen;

at least one memory storing at least one instruction; and at least one processor operatively connected to the at least one memory and configured to execute the at least one instruction to:

acquire, for a plurality of fingers of a user, a plurality of first images corresponding to a first type touch input for touching the touch screen with a pressure less than a predetermined pressure, and a plurality of second images corresponding to a second type touch input for touching the touch screen with a pressure greater than the predetermined pressure, the second type touch input having a greater area of a region corresponding to a touch input than the first type touch input, wherein the acquiring the plurality of first images and the plurality of second images comprises:

displaying, on the touch screen, a first user interface (UI) element for guiding the first type touch input and a second UI element for guiding the second type touch input, wherein a size of the second UI element is greater than a size of the first UI element;

based on detecting a user touch input for touching the first UI element, generating the plurality of first images; and based on detecting the user touch input for touching the second UI element, generating the plurality of second images;

train a neural network model for identifying a type of the user touch input of the user based on the plurality of first images and the plurality of second images, to obtain a trained neural network model;

based on acquiring the user touch input through the touch screen, acquire a plurality of input images corresponding to the user touch input;

identify the type of the user touch input by inputting, to the trained neural network model, the plurality of input images, the plurality of first images, and the plurality of second images;

based on the type of the user touch input being the first type touch input, perform a first function; and based on the type of the user touch input being the second type touch input, perform a second function different from the first function.

10. The electronic device of claim 9, wherein the at least one processor is further configured to execute the at least one instruction to:

based on the first function corresponding to the first type touch input being performed based on the user touch input, allocate a first label corresponding to the first type touch input to the plurality of input images and store the plurality of input images;

based on the second function corresponding to the second type touch input being performed based on the user touch input, allocate a second label corresponding to the second type touch input to the plurality of input images and store the plurality of input images; and retrain the neural network model based on the plurality of input images to which the first label is allocated and the plurality of input images to which the second label is allocated.

11. The electronic device of claim 9, wherein the at least one processor is further configured to execute the at least one instruction to:

acquire a first similarity between the plurality of input images and the plurality of first images and a second similarity between the plurality of input images and the plurality of second images;

acquire a plurality of first input images having the first similarity of at least a predetermined value among the plurality of first images, and acquire a plurality of second input images having the second similarity of at least the predetermined value among the plurality of second images; and identify the type of the user touch input of the user by inputting, to the trained neural network model, the plurality of input images, the plurality of first input images, and the plurality of second input images.

12. The electronic device of claim 11, wherein each of the first similarity and the second similarity is acquired based on at least one of the area, a shape, and a change over time of the region corresponding to the touch input included in each of the plurality of input images, the plurality of first images, and the plurality of second images.

13. The electronic device of claim 11, wherein the at least one processor is further configured to execute the at least one instruction to:

retrain the neural network model based on the plurality of input images, the plurality of first images, and the plurality of second images.

14. The electronic device of claim 9, wherein the second function corresponding to the second type touch input comprises a function of displaying at least one user interface (UI) element on the touch screen, and wherein the at least one UI element comprises at least one of a first function UI element for adjusting a volume of a speaker and a second function UI element for powering off the electronic device.

15. The electronic device of claim 9, wherein the at least one processor is further configured to execute the at least one instruction to:

allocate the plurality of input images to a plurality of first channels, the plurality of first images to a plurality of second channels and the plurality of second images to a plurality of third channels, respectively; and acquire input data for the trained neural network model by merging the plurality of first channels, the plurality of second channels, and the plurality of third channels with one another.

16. The electronic device of claim 9, wherein the at least one processor is further configured to execute the at least one instruction to:

acquire a first probability that the user touch input corresponds to the first type touch input, and a second probability that the user touch input corresponds to the second type touch input by inputting, to the trained neural network model, the plurality of input images, the plurality of first images, and the plurality of second images, and wherein the type of the user touch input is identified as the first type touch input based on the first probability being greater than a predetermined probability, and the type of the user touch input is identified as the second type touch input when the second probability being greater than the predetermined probability.

* * * * *